(12) United States Patent
Wallace (10) Patent No.: US 11,465,862 B2
(45) Date of Patent: Oct. 11, 2022

(54) AUTOLOADING SHINGLE FEEDER

(71) Applicant: Walco Systems, LLC, Avon Lake, OH (US)

(72) Inventor: Jason S. Wallace, Avon, OH (US)

(73) Assignee: Walco Systems, LLC, Avon Lake, OH (US)

( * ) Notice: Subject to any disclaimer, the term of this patent is extended or adjusted under 35 U.S.C. 154(b) by 0 days.

(21) Appl. No.: 17/386,479

(22) Filed: Jul. 27, 2021

(65) Prior Publication Data

US 2022/0033202 A1    Feb. 3, 2022

Related U.S. Application Data (60) Provisional application No. 63/057,594, filed on Jul. 28, 2020.

(51) Int. Cl.
B65G 59/06 (2006.01)

(52) U.S. Cl.
CPC .................................. B65G 59/067 (2013.01)

(58) Field of Classification Search
CPC ...... B65G 59/067; B65G 59/068; B65H 1/00; B65H 2301/44514
USPC ..................... 414/797.4, 797.6, 797.8, 797.9
See application file for complete search history.

(56) References Cited

U.S. PATENT DOCUMENTS

| | | | | |
|---|---|---|---|---|
| 4,718,808 A | * | 1/1988 | Hoshino | B65H 3/24 414/797.9 |
| 4,978,114 A | * | 12/1990 | Holbrook | B65H 3/5292 271/262 |
| 7,806,398 B2 | * | 10/2010 | Joyce | B65H 3/56 271/35 |
| 8,517,660 B2 | * | 8/2013 | DaCunha | B65H 3/5246 271/151 |
| 10,059,139 B2 | * | 8/2018 | Mueller | B42C 1/00 |
| 2002/0163116 A1 | * | 11/2002 | Bakoledis | B65H 3/46 271/167 |
| 2003/0141650 A1 | * | 7/2003 | Coret | B65H 3/5238 271/34 |

* cited by examiner

Primary Examiner — Lynn E Schwenning
(74) Attorney, Agent, or Firm — Rankin, Hill & Clark LLP (57) ABSTRACT

An autoloading shingle feeder that singulates an associated stack of media into associated individual articles. The autoloading shingle feeder includes a housing including a base, at least one loading belt with a loading surface that defines a horizontally extending loading plane. The autoloading shingle feeder also includes at least one feeding belt that is distinct from the at least one loading belt and includes a feeding surface that defines a feeding plane. The autoloading shingle feeder also includes a carriage assembly that limits vertical movement of the associated individual article when the associated individual article moves from the at least one loading belt to the at least one feeding belt. The carriage assembly includes at least one separator plate including a pressure portion that linearly extends in the loading direction for direct sliding contact with the associated individual article.

20 Claims, 6 Drawing Sheets

AUTOLOADING SHINGLE FEEDER

PRIORITY CLAIM

This application claims priority to U.S. provisional App. Ser. No. 63/057,594, filed Jul. 28, 2020, which is hereby incorporated by reference in its entirety.

BACKGROUND

This disclosure relates to an autoloading shingle feeder. More particularly, the present disclosure relates to an autoloading shingle feeder with improved feeding and singulating performance.

Traditionally, friction feeders consist of a continuous linear friction belt conveyor which forces the bottom-most piece of material in a stack of materials to be fed into a friction nip. However, delicate materials which are fed into a traditional feeder are not able to withstand the forces exerted on them in the friction nip. As such, the resulting attempt does not produce a predictable separation of the bottom-most article from the articles which lay on top of it. As such, improvements are needed.

SUMMARY

An autoloading shingle feeder that singulates an associated stack of media into associated individual articles. The autoloading shingle feeder includes a housing including a base and at least one loading belt disposed on the housing. The at least one loading belt includes a loading surface configured for direct contact with the associated stack of media. The loading surface defines a horizontally extending loading plane when the loading surface faces in an upward direction.

The autoloading shingle feeder also includes at least one feeding belt that is distinct from the at least one loading belt. The at least one loading belt is configured to carry the associated stack of media in a loading direction to the at least one feeding belt. The at least one feeding belt includes a feeding surface configured for direct contact with the associated individual article. Further, the feeding surface defines a feeding plane when the feeding surface faces in the upward direction. The autoloading shingle feeder also includes a carriage assembly that limits vertical movement of the associated individual article when the associated individual article moves from the at least one loading belt to the at least one feeding belt. The carriage assembly includes at least one separator plate including a pressure portion that linearly extends in the loading direction for direct sliding contact with the associated individual article.

The foregoing and other features of the disclosure are hereinafter more fully described below, the following description setting forth in detail certain illustrative embodiments, these being indicative, however, of but a few of the various ways in which the principles of the present disclosure may be employed.

DETAILED DESCRIPTION

Figure 1A:
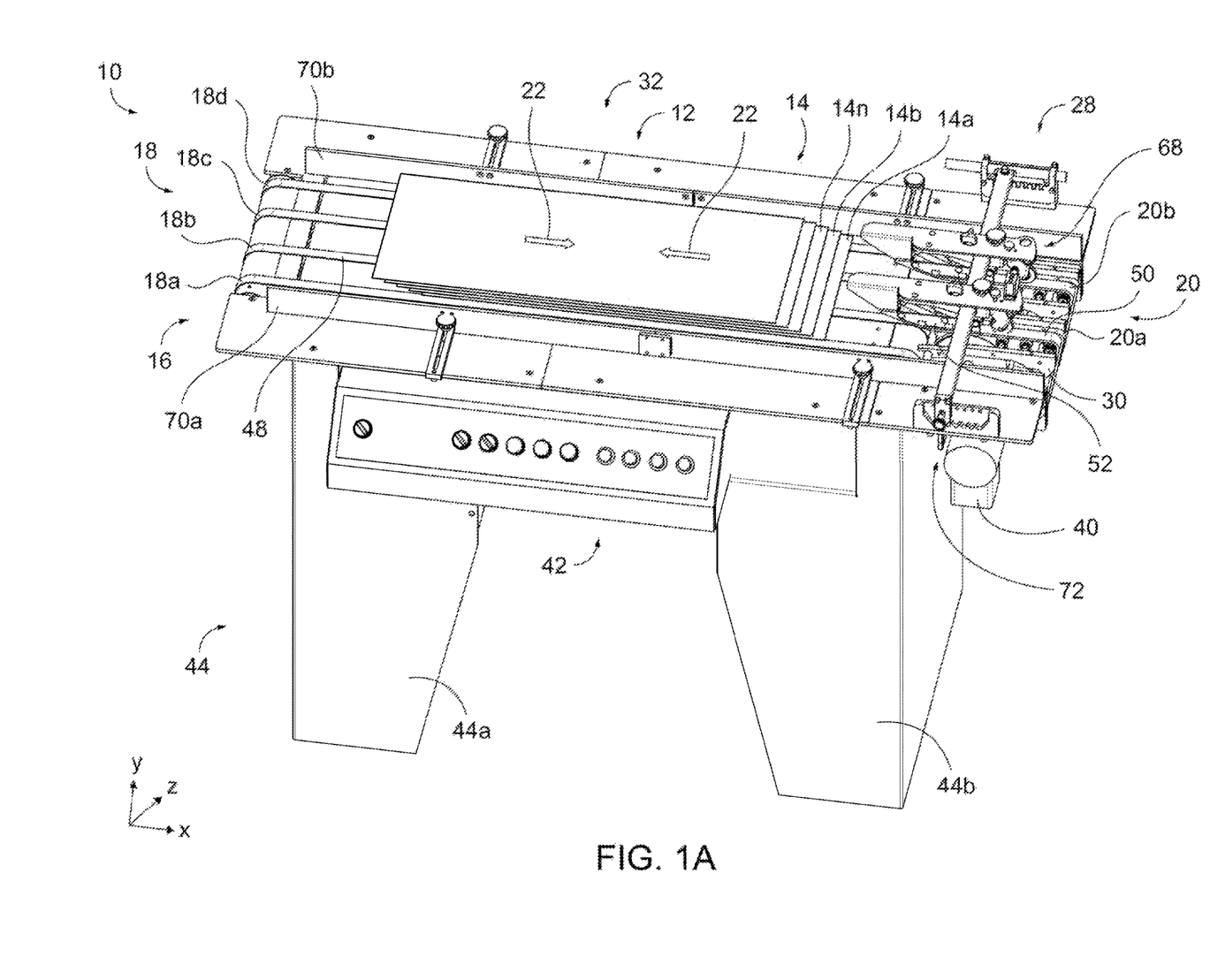
FIG. 1A is a perspective view of an autoloading shingle feeder.

Initially, it is noted that any general reference to FIG. 1 will be understood to apply to FIGS. 1A-1D unless otherwise noted. Further, the term shingle will be understood to be a common term in the art that refers to a stack of media that is staggered as is shown in FIG. 1A.

Figure 3:
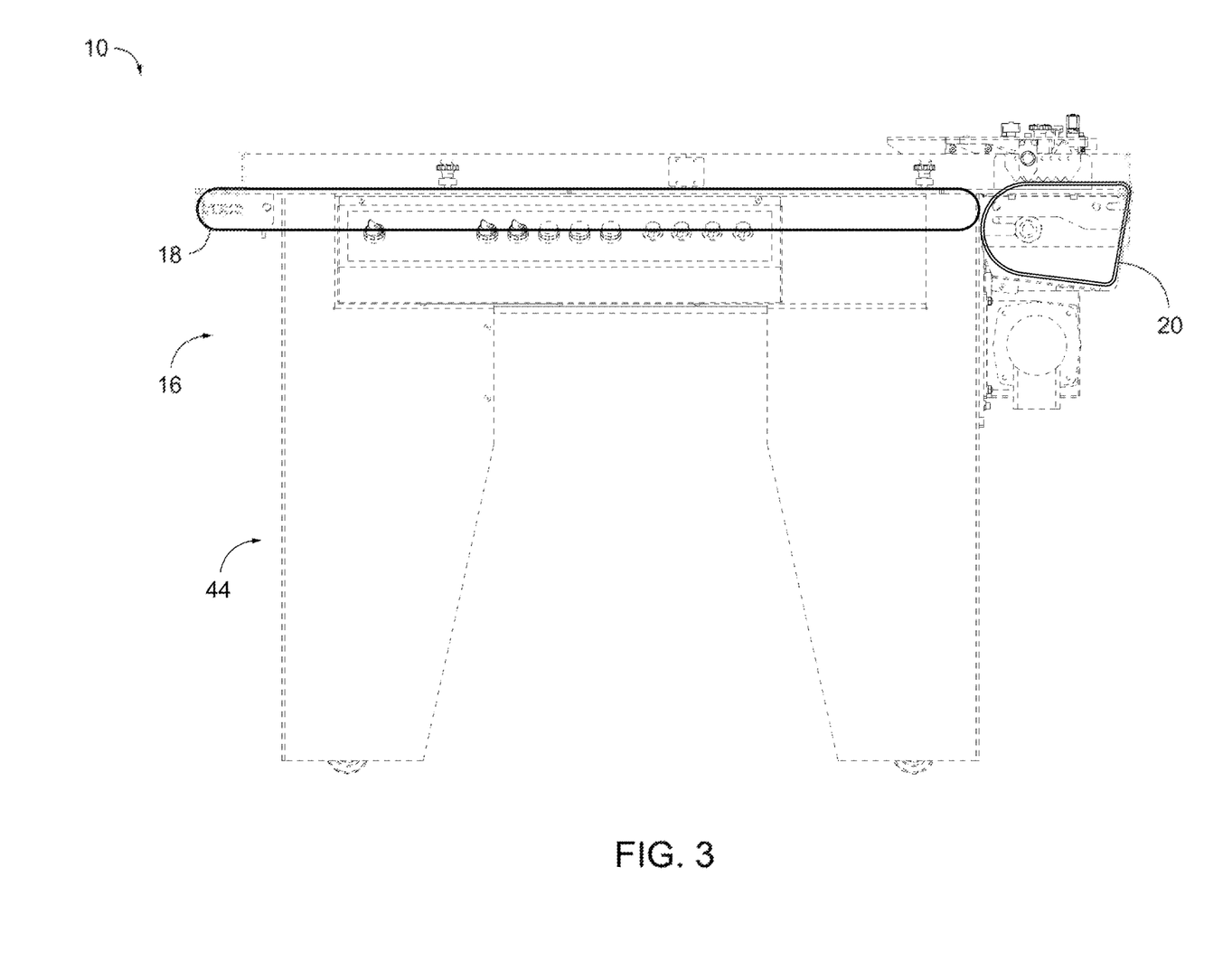
FIG. 3 is an elevation view of the autoloading shingle feeder of FIG. 1A illustrating a belt path of a loading belt and of a feeding belt of the autoloading shingle feeder.

With reference to FIGS. 1 and 3, an autoloading shingle feeder 10 that singulates an associated stack of media 12 into articles 14a-n is shown. As will be understood, to singulate is to separate the stack of media 12 into individual articles 14. Then, tasks such as, for example, stamping or addressing can be performed on the individual articles 14, as the articles 14 will not overlap, thereby providing access to upward (and downward) facing surfaces of the articles 14a-n.

Figure 1B:
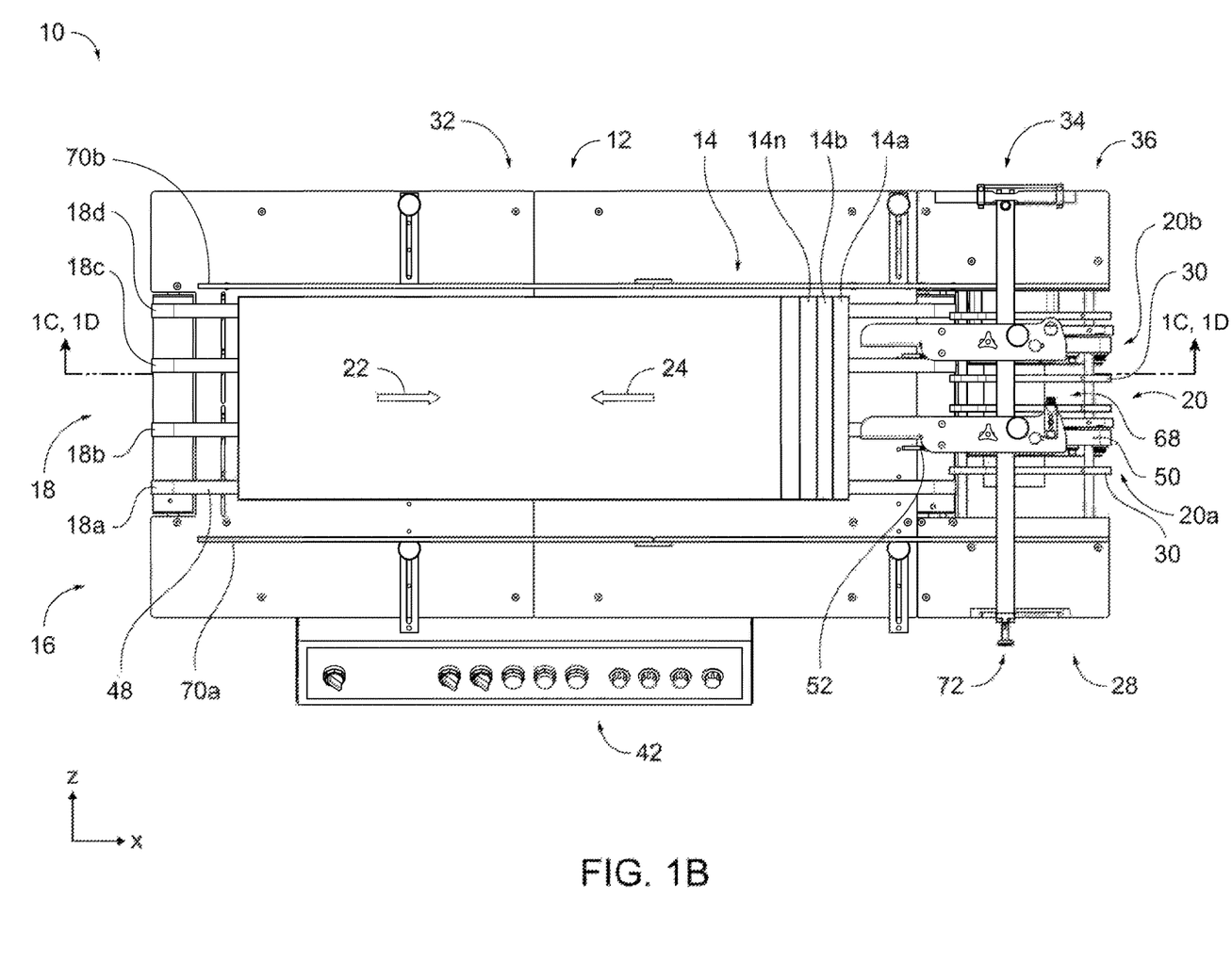
FIG. 1B is a plan view of FIG. 1A.
Figure 1C:
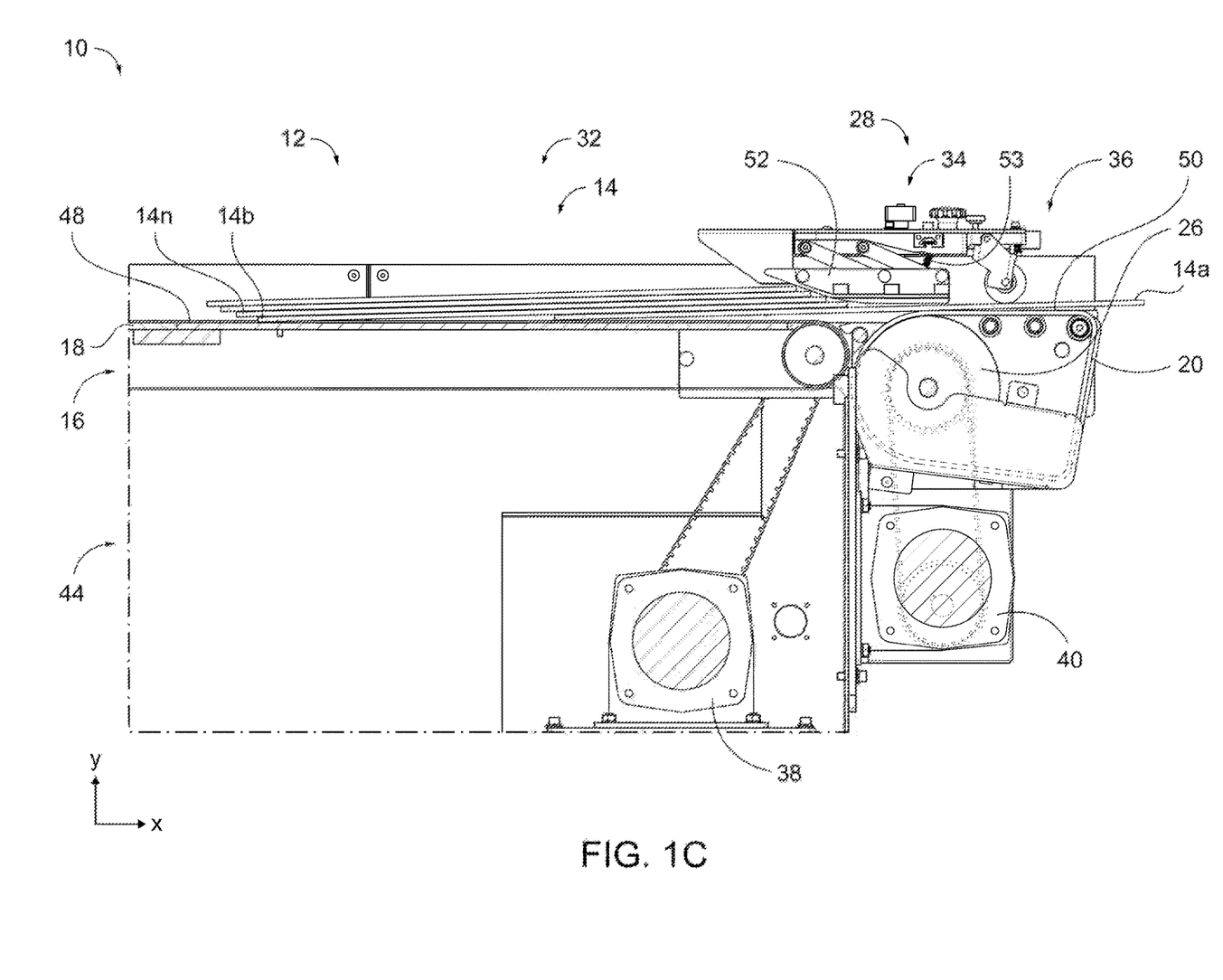
FIG. 1C is a sectional elevation view along lines 1C-1C of FIG. 1A.

The feeder 10 can include a housing 16, at least one loading belt 18, at least one feeding belt 20, a roller 26, a carriage assembly 28, and at least one guide finger 30. Further, as shown in FIGS. 1A-1B, the feeder 10 can include a loading zone 32, and as shown in FIG. 1C, a transition zone 34. Additionally, with reference to FIG. 1D, the feeder 10 can include a feeding zone 36. As showing in FIGS. 1C-1D, the feeder 10 can also include a loading belt power source 38 and a feeding belt power source 40. With reference to FIG. 1A, the feeder 10 may also include a controller 42 and a sensor 68.

As shown in FIG. 1, the feeder 10 can include the housing 16. The housing 16 may serve as a frame to which components of the feeder 10 are mounted or attached. The housing 16 can include a base 44 that is configured to contact a ground surface. As illustrated, the base 44 includes a first leg 44a and a second leg 44b. However, other arrangements are contemplated. The housing 16, and more particularly, the base 44 may be made of any number of materials that provide sufficient strength to support the various components of the feeder 10. At least two guides 70a, 70b may be attached to the housing 16 and be positioned such that media 12 put between the guides 70a, 70b can only move away perpendicular away from the loading belt 18.

Next, the at least one loading belt 18 and the at least one feeding belt 20 will be reviewed. As illustrated, the at least one loading belt 18 can include a plurality of loading belts 18a, 18b, 18c, 18d that are disposed on the housing 16. For brevity, the discussion regarding the loading belt 18 will be understood to be applicable to all of the loading belts 18a, 18b, 18c, 18d unless otherwise noted. As illustrated, the loading belt 18 is a continuous belt.

It will be understood that the feeder 10 could include more or less loading belts 18 than illustrated without departing from the scope of this disclosure. The loading belt 18 includes a loading surface 48 configured for direct contact with the associated stack of media 12, and more particularly the individual articles 14a, 14b, 14n, and most particularly a bottom-most article 14a. The loading surface 48 of the loading belt 18 defines a horizontally extending loading plane when the loading surface 48 faces in an upward direction.

The loading belt 18 is can be configured such that it can hold a large quantity of articles 14a-n such that the operator filling it will not have to continually tend to it. The loading belt 18 can continuously run whenever the feeding belt 20 belt is in motion.

With reference to the axis that is shown in some of the figures, the loading plane would be in the X-Z axis plane. The loading belt 18 can be made from a variety of including for example, rubber, plastic, or fabric and/or any combination thereof. The loading belt 18 is configured to carry the associated stack of media 12 in a loading direction 22 to the feeding belt 20. Further, the loading belt 18 defines an unloading direction 24 that is opposite to the loading direction 22.

As illustrated, the at least one feeding belt 20 can include a plurality of feeding belts 20a, 20b, 20c, 20d that can be disposed on the housing 16. For brevity, the discussion regarding the feeding belt 20 will be understood to be applicable to all of the feeding belts 20a, 20b, 20c, 20d. It will be understood that the feeder 10 could include more or less feeding belts 20 than illustrated without departing from the scope of this disclosure. The plurality of feeding belts 20a, 20b, 20c, 20d can be utilized such that they are able to act in tandem momentarily on the lead edge of the articles 14. However, once the speed of the articles 14 matches the speed of the feeding belt 20a, 20b, 20c, 20d, the entirety of the articles 14 (i.e., not just the lead edges) are carried by the feeding belts 20a, 20b, 20c, 20d.

The feeding belt 20 can be an independent endless belt which travels parallel to the loading belt 18. The upward projected area of the feeding belt 20 is parallel to the loading belt 18, but is offset a distance to expose the radial surface of the roller 26. The roller 26 lends its shape to the feeding belt 20 so as to drive and therefore provides a surface which the articles 14a-n received from the loading belt 18 are forced to climb up. Further, the roller 26 can directly contact the feeding belt 20.

The feeding belt 20 can be made from a variety of including for example, rubber, plastic, or fabric and/or any combination thereof. The feeding belt 20 is configured to carry the associated stack of media 12 in the loading direction 22. The feeding belt 20 includes a feeding surface 50 configured for direct contact with the article 14. The feeding surface 50 of the feeding belt 20 defines a feeding plane when the feeding surface 50 faces in the upward direction.

With reference to the axis that is shown in some of the figures, the feeding plane would be in the X-Z axis plane, like the loading plane, but at a different Y elevation than the loading plane. The feeding plane defines a feeding plane altitude and the loading plane defines a loading plane altitude. Notably, the feeding plane altitude is greater than the loading plane altitude such that a vertical distance between the base 44 and the feeding plane is greater than a vertical distance between the base 44 and the loading plane.

Further, as shown by FIG. 3, it is notable that the feeding belt 20 can be distinct from the loading belt 18. For example, the loading belt 18 and the feeding belt 20 can each be made of a continuous loop that do not overlap. The unique path of the feeding belt 20 allows for the most forward progressed articles 14 to be forced into the separator plate 52 while articles 14 several layers above are only influenced by the loading belt 18. The length of exposure to the separator plate 52 can also be seen. This length of exposure is adjustable by moving the carriage assembly 28 which carries the separator plate 52 parallel to the loading direction 22.

The loading belt 18 can travel in a continuous path about pulleys and or rollers as is known in the art. As such, a discussion regarding these additional components related to the loading belt 18 will be omitted for brevity. As noted hereinbefore, the feeder 10 can include the roller 26 rotatably supported by the housing 16. As shown in FIG. 1, the roller 26 can directly contact the feeding belt 20. The roller 26 is supported by the housing 16 such that the feeding surface 50 of the feeding belt 20 does not share a common horizontal plane with the loading surface 48 of the loading belt 18. Additionally, the roller 26 is supported by the housing 16 such that the feeding surface 50 of the feeding belt 20 is elevated as compared to the loading surface 48 of the loading belt 18.

Figure 1D:
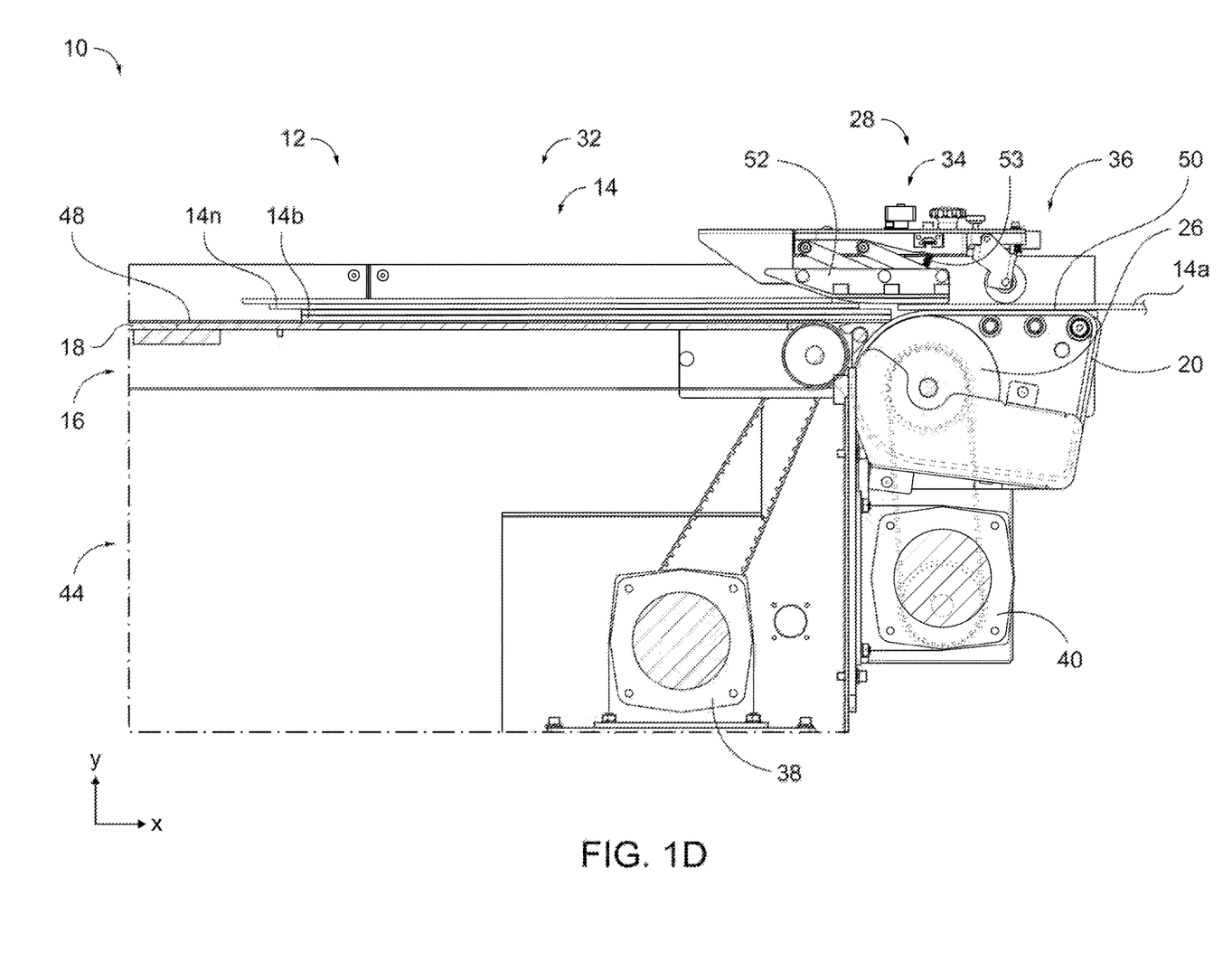
FIG. 1D is a sectional elevation view along lines 1D-1D of FIG. 1A.
Figure 2:
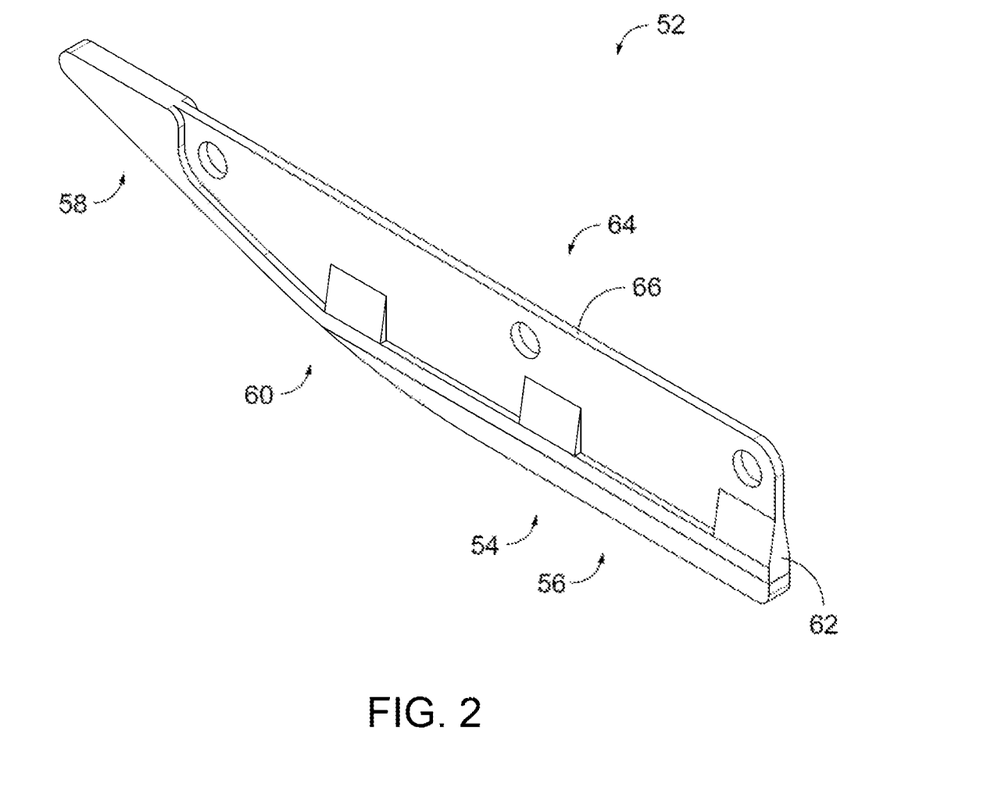
FIG. 2 is a perspective view of a separator plate of the autoloading shingle feeder of FIG. 1A.

As noted hereinbefore, the feeder 10 can also include the carriage assembly 28, as shown in FIGS. 1-2. The carriage assembly 28 limits vertical movement (Y axis) of the article 14 when the article 14 moves from the loading belt 18 to the feeding belt 20. Transverse adjustment of the carriage assembly 28 is achieved by sliding the carriage assembly 28 along a transverse bridge 72. Parallel to product travel adjustment is achieved by remounting the transverse bridge 72 in an array of holes.

The carriage assembly 28 includes a separator plate 52 that directly contacts the article 14 to singulate the article 14 from the stack of media 12. The separator plate 52 can alternatively be referred to as a friction nip. As shown in FIG. 1A, media 12 is laid down onto the loading zone 32 of the feeder 10. The bottom-most article 14a is closest to the loading belt 18 is to be the on the bottom of the stack of media 12. The article 14 entering the feeding belt 20 from the loading belt 18 is depicted, and shows the path articles 14 must take to enter the separator plate 52. FIGS. 1C-1D illustrate the stack of media 12 which has been influenced by the separator plate 52. An exaggerated shingle is the product of forward movement generated by the loading belt 18 and the feeding belt 20.

It is noted that the separator plate 52 remains stationary in the loading direction 22 with respect to the loading belt 18 during operation of the loading belt 18 and the feeding belt 20. As is considered apparent in view of FIG. 1A, the carriage assembly 28 is adjustable in the loading direction 22 and the unloading direction 24. However, said adjustability is not while the feeder 10 is in operation. Rather, said adjustability is only for when the loading belt 18 and the feeding belt 20 are not moving.

This adjustability is useful depending on the type of media 12 that is being singulated. The separator plate 52 can be made from a variety of materials and by a variety of manufacturing methods. For example, it is envisioned that the separator plate 52 could be made from a variety of polymer products by additive manufacturing. Further, the separator plate 52 could be of unitary construction or could be of composite construction in which different portions of the separator plate 52 are of different materials.

The separator plate 52 has a distinct shape which facilitates the separation of the articles 14 being fed. As illustrated, the carriage assembly 28 includes a plurality of separator plates 52. The separator plates 52 can be set a distance apart such that they can be positioned a distance away from the edges of the feeding belt 20.

The autoloading shingle feeder 10 utilizes a uniquely contoured separator plate 52 and feeding belt 20 positioned in such a way that the feeding of delicate materials (i.e., singulating the stack of media 12 into individual articles 14) is facilitated and improved. The separator plate 52 presents a profile which is far more gradual and is positioned in such a way that presented articles 14 are caused to shingle, or be forced to slide apart from one another in such a way that their lead edges are prominently exposed before being singulated.

The feeding belt 20 influences the articles 14 under the separator plate 52. This enhancement lowers the chance of delicate articles 14 rolling under the separator plate 52 due to high forces driving the rear of the article 14. The initial exposure of the path of the feeding belt 20 is the large diameter roller 26 which projects above the loading plane on which the staged articles 14 are laying. This forces a lead edge of the articles 14 to follow an angled upward trajectory. This trajectory is interrupted by the shaped separator plate 52. The feeding belt 20 is then continued on by a parallel path to the feeding plane.

Once the lead edges of the articles 14 are influenced by the projected body of the high friction value surface of the separator plate 52, they are forced to become shingled prior to being singulated. This effect greatly enhances the separation ability of the separator plate 52. The separated articles 14 are then driven through the separator plate 52, away from the staged articles 14 eventually becoming singulated. The singulated articles 14 are then conveyed away from the separator plate 52.

With particular attention to FIG. 2, the separator plate 52 can include a pressure portion 54 with a pressure surface 56, a ramp portion 58, a guide portion 60, a trailing face 62, and a spline portion 64 with a spline surface 66. The pressure portion 54 can linearly extend in the loading direction 22 for direct sliding contact with the article 14.

Further, the pressure portion 54 defines a minimum vertically spaced distance for the separator plate 52 between the feeding plane and the separator plate 52. Additionally, the pressure portion 54 extends in the loading direction 22 so as to be parallel to the feeding surface 50. The pressure surface 56 that faces in a first direction and defines a first coefficient of friction.

The separator plate 52 can be adjustable both transversely perpendicular to the loading direction 22, and also parallel to the loading direction 22. This enhancement is not required, but can be included for maximum adjustability for a wide range of articles 14 to be fed. The adjustment which allows the separator plate 52 to be positioned along the direction of belt travel allows for increased or decreased lengths of separator plate 52 to act on the articles 14 to be fed which in turn allows for greater or lower separation forces to be applied.

The high friction surfaces can be positioned above or slightly below the uppermost surface of the feeding belt 20. The separator plates 52 can be spring-loaded with a spring 53 so as to bias the separator plates 52 toward the feeding belt 20. This allows the separator plates 52 to travel away from the feeding belt 20 while maintaining pressure so that articles 14 with irregular thicknesses may be accommodated. As will be appreciated, this could be irregular thickness in a single article 14 or variation in thickness between different articles 14.

The separator plates 52 influence the top of the media 12 so that curled or delicate edges can be accepted into the separator plate 52 without causing a crease which would inhibit feeding. The pressure surface 56 of the separator plate 52, which contacts articles 14 to be singulated, can be made of a high friction material. This high friction material may be affixed or integral to the separator plate 52. These are the edges which form the separator plate 52 and retard the upper most articles 14 of a pile. In this design, the edges that form the separator plate 52 are parallel to the feeding belt 20.

The separator plate 52 can also include the ramp portion 58. In the loading direction 22, the ramp portion 58 is upstream from the pressure portion 54. Further, the ramp portion 58 is vertically spaced from the feeding plane a distance that is greater than a vertical distance between the pressure portion 54 and the feeding plane. Additionally, a vertical distance between the ramp portion 58 and the loading plane decreases along the loading direction 22 so as to facilitate singulation of the associated stack of media 12 into the articles 14. It is also noted that the ramp portion 58 can define a linear shape in elevation view.

The separator plate 52 can also include the guide portion 60. The guide portion 60 is downstream from the ramp portion 58 and upstream from the pressure portion 54. Further, the guide portion 60 can define a curvilinear shape in elevation view. The guide portion 60 may extend between the ramp portion 58 and the pressure portion 54. Further, the ramp portion 58, the guide portion 60, and the pressure portion 54 cooperate to direct the article to directly contact the feeding belt 20. The pressure portion 54 and the ramp portion 58 are shaped to facilitate the shingling of the articles 14 to be fed.

The separator plate 52 can also include the trailing face 62. The trailing face 62 is downstream from the ramp portion 58 so as to be disposed at an opposite end of the separator plate 52 as the ramp portion 58. Further, the separator plate 52 may also include the spline portion 64. The spline portion 64 can define a linear shape in elevation view that extends from the trailing face 62 to the ramp portion 58. Notably, a vertical distance between the spline portion 64 and the pressure portion 54 is constant along the loading direction 22.

Further, a vertical distance between the spline portion 64 and the ramp portion 58 decreases when traveling away from the trailing face 62. The spline portion 64 defines a spline length that extends between the trailing face 62 and the ramp portion 58. Further, the trailing face 62 define a trailing face length that extends between the pressure portion 54 and the spline portion 64. It is also noted that the spline length is greater than the trailing face length.

As noted hereinbefore, the spline portion 64 includes the spline surface 66. The spline surface 66 faces in a second direction and defines a second coefficient of friction. The first direction, which was initially referenced with regard to the pressure surface 56, and the second direction are opposite to one another. Further, the first coefficient of friction is greater than the second coefficient of friction.

With reference to FIGS. 1A-1B, the feeder 10 includes the guide finger 30. The guide finger 30 is laterally spaced (Z axis) from the loading belt 18 and the feeding belt 20. The guide finger 30 is configured for direct contact with the bottom-most associated article 14a in the associated stack of media 12.

With attention to FIG. 1, the loading zone 32 is shown. In the loading zone 32, the associated stack of media 12 is placed to be eventually separated downstream into the articles 14. In the loading zone 32, the bottom-most associated article 14a in the associated stack of media 12 contacts the loading belt 18 and not the feeding belt 20 when in the loading zone 32. In contrast, in the transition zone 34, the bottom-most associated article 14 in the associated stack of media 12 of the shingle simultaneously contacts the loading belt 18 and the feeding belt 20. As will be appreciated, the transition zone 34 is downstream from the loading zone 32 in the loading direction 22.

Finally, the feeding zone 36 is downstream from the transition zone 34 in the loading direction 22 and the loading zone 32 is upstream in the loading direction 22 from the feeding zone 36 such that the transition zone 34 is disposed between the loading zone 32 and the feeding zone 36. The bottom-most associated article 14a in the associated stack of media 12 that was previously in the transition zone 34 (and the loading zone 32) contacts the feeding belt 20 and not the loading belt 18 when in the feeding zone 36.

As will be appreciated, the aforementioned description is applicable when the articles 14 are sized so that they may be entirely disposed solely on either the loading belt 18 or the feeding belt 20. However, it will be understood that the feeder 10 is capable of processing articles 14 that are of a size such that the bottom-most associated article 14a would be simultaneously disposed on the loading belt 18 and the feeding belt 20, and as such, could simultaneously be in the loading zone 32, the transition zone 34, and the feeding zone 36. Nevertheless, the aforementioned description is instructive so that the general layout of the zones 32, 34, 36 of the feeder 10 will be understood.

With reference to FIGS. 1C-1D, the loading belt power source 38 and the feeding belt power source 40 are shown. The loading belt power source 38 can be coupled by traditional components to the loading belt 18 such that the loading belt power source 38 selectively moves the loading belt 18 in the loading direction 22. Further, the feeding belt power source 40 can be coupled by traditional components to the feeding belt 20 such that the feeding belt power source 40 selectively moves the feeding belt 20 in the loading direction 22.

As illustrated, the loading belt power source 38 and the feeding belt power source 40 are linked to the loading belt 18 and the feeding belt 20 by way of toothed belts, but other linking means are envisioned. As will be appreciated, the loading belt power source 38 and the feeding belt power source 40 could be electric motors. However, other power sources are contemplated.

As shown in FIG. 1A, the feeder 10 can also include the controller 42. The controller 42 controls the loading belt power source 38 and the feeding belt power source 40 so as to allow independently movement of the loading belt 18 and the feeding belt 20 for transfer of the individual articles 14 from the loading belt 18 to the feeding belt 20. Any number and a variety of controllers are envisioned.

Further, the controller 42 can communicate with the loading belt power source 38 and the feeding belt power source 40 in any number of manners (e.g., wired and wireless communication) without departing from the scope of this disclosure. The controller 42 can also communicate with a variety of sensors that sense conditions of operation of the feeder 10 and/or positions or conditions of the media 12 and articles 14.

For example, the sensor 68 could be coupled to the controller 42 and the sensor 68 would sense a position of the media 12 and the articles 14. Then, the controller 42 would issue commands to adjust a position, a speed, and/or acceleration of the loading belt 18 and the feeding belt 20 by way of the loading belt power source 38 and the feeding belt power source 40.

The sensor 68 can aid in the consistency of fed media and also offer a faster reaction to new media 12 being placed onto the loading belt 18. The sensor 68 can be located on the carriage assembly 28 that also houses the separator plate 52. The sensor 68 can be aimed so that it can detect whether an article 14 is present under its sensed area. If an article 14 is not present, the sensor 68 sends a signal to the controller 42, which makes the loading belt 18 speed up during the sensor 68 signal. The signal can be continuous if there is no media 12 under it. The sensor 68 can be located at an exit end of the loading belt 18.

An autoloading shingle feeder been described above with particularity. Modifications and alterations will occur to those upon reading and understanding the preceding detailed description. The disclosure, however, is not limited to only the embodiments described above. Instead, the disclosure is broadly defined by the appended claims and the equivalents thereof.

Moreover, it will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An autoloading shingle feeder that singulates an associated stack of media into associated individual articles, the autoloading shingle feeder comprising:
   a housing including a base;
   at least one loading belt disposed on the housing, the at least one loading belt including a loading surface configured for direct contact with the associated stack of media, and wherein the loading surface defines a horizontally extending loading plane when the loading surface faces in an upward direction;
   at least one feeding belt that is distinct from the at least one loading belt, wherein the at least one loading belt is configured to carry the associated stack of media in a loading direction to the at least one feeding belt, wherein the at least one feeding belt includes a feeding surface configured for direct contact with the associated individual article, and wherein the feeding surface defines a feeding plane when the feeding surface faces in the upward direction; and
   a carriage assembly that limits vertical movement of the associated individual article when the associated individual article moves from the at least one loading belt to the at least one feeding belt, wherein the carriage assembly includes at least one separator plate including a pressure portion that linearly extends in the loading direction for direct sliding contact with the associated individual article and a ramp portion that is upstream from the pressure portion in the loading direction, and wherein the ramp portion is vertically spaced from the feeding plane a distance that is greater than a vertical distance between the pressure portion and the feeding plane.

2. The autoloading shingle feeder of claim 1, wherein the pressure portion defines a minimum vertically spaced distance for the at least one separator plate between the feeding plane and the at least one separator plate, and wherein the pressure portion extends in the loading direction so as to be parallel to the feeding surface.

3. The autoloading shingle feeder of claim 1, wherein the feeding plane defines a feeding plane altitude and the loading plane defines a loading plane altitude, and wherein the feeding plane altitude is greater than the loading plane altitude such that a vertical distance between the base and the feeding plane is greater than a vertical distance between the base and the loading plane.

4. The autoloading shingle feeder of claim 1, wherein a vertical distance between the ramp portion and the loading plane decreases along the loading direction so as to facilitate singulation of the associated stack of media into the associated individual articles.

5. The autoloading shingle feeder of claim 1, wherein the at least one separator plate includes a guide portion downstream from the ramp portion and upstream from the pressure portion, and wherein the guide portion defines a curvilinear shape in elevation view.

6. The autoloading shingle feeder of claim 5, wherein the ramp portion defines a linear shape in elevation view, and wherein the guide portion extends between the ramp portion and the pressure portion.

7. The autoloading shingle feeder of claim 5, wherein the ramp portion, the guide portion, and the pressure portion cooperate to direct the associated individual article to directly contact the feeding belt.

8. The autoloading shingle feeder of claim 1, wherein the at least one separator plate includes a trailing face that is downstream from the ramp portion so as to be disposed at an opposite end of the at least one separator plate as the ramp portion.

9. The autoloading shingle feeder of claim 8, wherein the at least one separator plate includes a spline portion that defines a linear shape in elevation view that extends from the trailing face to the ramp portion, and wherein a vertical distance between the spline portion and the pressure portion is constant along the loading direction.

10. The autoloading shingle feeder of claim 9, wherein a vertical distance between the spline portion and the ramp portion decreases when traveling away from the trailing face.

11. The autoloading shingle feeder of claim 9, wherein the spline portion defines a spline length that extends between the trailing face and the ramp portion, wherein the trailing face define a trailing face length that extends between the pressure portion and the spline portion, and wherein the spline length is greater than the trailing face length.

12. The autoloading shingle feeder of claim 9, wherein the pressure portion includes a pressure surface that faces in a first direction and defines a first coefficient of friction and the spline portion includes a spline surface facing in a second direction and defining a second coefficient of friction and, and wherein the first direction and the second direction are opposite to one another and the first coefficient of friction is greater than the second coefficient of friction.

13. The autoloading shingle feeder of claim 1, wherein the at least one separator plate remains stationary in the loading direction with respect to the at least one loading belt, and wherein the at least one loading belt defines an unloading direction that is opposite to the loading direction.

14. The autoloading shingle feeder of claim 13, further including:
  a loading belt power source that selectively moves the at least one loading belt in the loading direction;
  a feeding belt power source that selectively moves the at least one feeding belt in the loading direction;
  a controller that controls the loading belt power source and the feeding belt power source so as to allow independently movement of the loading belt and the feeding belt for transfer of the individual articles from the loading belt to the feeding belt; and
  a sensor coupled to the controller, wherein the sensor senses a position of the article and the controller issues commands to adjust at least one of a position, a speed, and acceleration of at least one of the loading belt and the feeding belt by way of the loading belt power source and the feeding belt power source, respectively.

15. The autoloading shingle feeder of claim 1, further including:
  a spring that biases the at least one separator plate toward the feeding belt so that the at least one separator plate can travel away from the feeding belt while maintaining pressure to accommodate an irregular thickness of the article.

16. The autoloading shingle feeder of claim 1, wherein the pressure portion of the at least one separator plate includes a pressure surface that linearly extends in the loading direction to direct the associated individual article to directly contact the feeding belt.

17. An autoloading shingle feeder that singulates an associated stack of media into associated individual articles, the autoloading shingle feeder comprising:
  a housing including a base;
  at least one loading belt disposed on the housing, the at least one loading belt including a loading surface configured for direct contact with the associated stack of media, and wherein the loading surface defines a horizontally extending loading plane when the loading surface faces in an upward direction;
  at least one feeding belt that is distinct from the at least one loading belt, wherein the at least one loading belt is configured to carry the associated stack of media in a loading direction to the at least one feeding belt, wherein the at least one feeding belt includes a feeding surface configured for direct contact with the associated individual article, and wherein the feeding surface defines a feeding plane when the feeding surface faces in the upward direction;
  a carriage assembly that limits vertical movement of the associated individual article when the associated individual article moves from the at least one loading belt to the at least one feeding belt, wherein the carriage assembly includes at least one separator plate including a pressure portion that linearly extends in the loading direction for direct sliding contact with the associated individual article;
  a loading zone in which the associated stack of media is placed to be eventually separated downstream into the associated individual articles, wherein a bottom-most associated article in the associated stack of media contacts the loading belt and not the feeding belt when in the loading zone;
  a transition zone in which the bottom-most associated article in the associated stack of media of the shingle simultaneously contacts the loading belt and the feeding belt, wherein the transition zone is downstream from the loading zone in the loading direction; and
  a feeding zone that is downstream from the transition zone in the loading direction and the loading zone is upstream in the loading direction from the feeding zone such that the transition zone is disposed between the loading zone and the feeding zone, wherein the bottom-most associated article in the associated stack of media that was previously in the transition zone contacts the feeding belt and not the loading belt when in the feeding zone.

18. The autoloading shingle feeder of claim 17, further comprising a guide finger spaced from the at least one loading belt and the at least one feeding belt that is configured for direct contact with the bottom-most associated article in the associated stack of media.

19. An autoloading shingle feeder that singulates an associated stack of media into associated individual articles, the autoloading shingle feeder comprising:

a housing including a base;

at least one loading belt disposed on the housing, the at least one loading belt including a loading surface configured for direct contact with the associated stack of media, and wherein the loading surface defines a horizontally extending loading plane when the loading surface faces in an upward direction;

at least one feeding belt that is distinct from the at least one loading belt, wherein the at least one loading belt is configured to carry the associated stack of media in a loading direction to the at least one feeding belt, wherein the at least one feeding belt includes a feeding surface configured for direct contact with the associated individual article, and wherein the feeding surface defines a feeding plane when the feeding surface faces in the upward direction;

a carriage assembly that limits vertical movement of the associated individual article when the associated individual article moves from the at least one loading belt to the at least one feeding belt, wherein the carriage assembly includes at least one separator plate including a pressure portion that linearly extends in the loading direction for direct sliding contact with the associated individual article; and a roller rotatably supported by the housing, wherein the roller directly contacts the feeding belt, and wherein the roller is supported by the housing such that the feeding surface of the feeding belt does not share a common horizontal plane with the loading surface of the loading belt.

20. The autoloading shingle feeder of claim 19, wherein the roller is supported by the housing such that the feeding surface of the feeding belt is elevated as compared to the loading surface of the loading belt.

* * * * *